United States Patent
Tachino et al.

(10) Patent No.: US 11,933,896 B2
(45) Date of Patent: Mar. 19, 2024

(54) OPTICAL DISTANCE MEASURING APPARATUS

(71) Applicant: DENSO CORPORATION, Kariya (JP)

(72) Inventors: Yoshihide Tachino, Kariya (JP); Isamu Takai, Kariya (JP)

(73) Assignee: DENSO CORPORATION, Kariya (JP)

( * ) Notice: Subject to any disclaimer, the term of this patent is extended or adjusted under 35 U.S.C. 154(b) by 755 days.

(21) Appl. No.: 17/061,239

(22) Filed: Oct. 1, 2020

(65) Prior Publication Data

US 2021/0018624 A1 Jan. 21, 2021

Related U.S. Application Data

(63) Continuation of application No. PCT/JP2019/013168, filed on Mar. 27, 2019.

(30) Foreign Application Priority Data

Apr. 4, 2018 (JP) .................................. 2018-072108

(51) Int. Cl.
*G01S 17/10* (2020.01)
*G01S 7/4865* (2020.01)
*G01S 17/931* (2020.01)

(52) U.S. Cl.
CPC ............ *G01S 17/10* (2013.01); *G01S 7/4865* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,243,553 A | 9/1993 | Flockencier | |
| 5,523,835 A | 6/1996 | Tanaka | |
| 6,088,085 A | 7/2000 | Wetteborn | |
| 2013/0175435 A1* | 7/2013 | Drader | G01S 7/4861 250/208.2 |

(Continued)

FOREIGN PATENT DOCUMENTS

| JP | 2010-072699 A | 4/2010 |
|---|---|---|
| JP | 5644294 B2 | 11/2014 |

(Continued)

*Primary Examiner* — Yuqing Xiao
*Assistant Examiner* — Jempson Noel
(74) *Attorney, Agent, or Firm* — MASCHOFF BRENNAN (57) ABSTRACT

In an optical distance measuring apparatus, a light source irradiates a target object with a light pulse having a first pulse width. A light receiver outputs a pulse signal that represents reflection light from the target object being incident on the light receiver, and has a second pulse width that is larger than or equal to the first pulse width. A histogram generator records, every predetermined period, a frequency representing the number of outputted pulse signals to thereby generate a histogram. A peak detector detects, from the histogram, an edge point of a peak figure included in the histogram. A distance calculator subtracts, from a time indicative of the edge point of the peak figure, a time length of the second pulse width to thereby calculate a target time, and calculates a distance to the target object as a function of the calculated target time.

8 Claims, 9 Drawing Sheets

(56) References Cited

U.S. PATENT DOCUMENTS

| | | | |
|---|---|---|---|
| 2014/0103196 A1* | 4/2014 | Soga | G01S 7/4865 |
| | | | 250/206 |
| 2016/0033644 A1 | 2/2016 | Moore | |
| 2018/0164415 A1* | 6/2018 | Buckley | G01S 17/18 |
| 2018/0253404 A1* | 9/2018 | Moore | G01S 7/4863 |

FOREIGN PATENT DOCUMENTS

| | | | |
|---|---|---|---|
| JP | 2016-176750 A | | 10/2016 |
| JP | 2016176750 A | * | 10/2016 |
| JP | 2017-161321 A | | 9/2017 |

\* cited by examiner

OPTICAL DISTANCE MEASURING APPARATUS

CROSS REFERENCE TO RELATED APPLICATION

This application is a bypass continuation application of currently pending international application No. PCT/JP2019/013168 filed on Mar. 27, 2019 designating the United States of America, the entire disclosure of which is incorporated herein by reference.

This application is based on and claims the benefit of priority from Japanese Patent Application No. 2018-72108 filed on Apr. 4, 2018, the disclosure of which is incorporated in its entirety herein by reference.

TECHNICAL FIELD

The present disclosure relates to optical distance measuring apparatuses.

BACKGROUND

A known optical distance measuring apparatus measures the distance of a target object relative to the apparatus using light.

SUMMARY

An optical distance measuring apparatus according to an exemplary aspect of the present disclosure includes a histogram generator, a peak detector, and a distance calculator. The histogram generator records, every predetermined period, a frequency representing the number of pulse signals outputted from at least one light receiver to thereby generate a histogram. The peak detector detects, from the histogram, an edge point of at least one peak figure included in the histogram. The distance calculator subtracts, from a time indicative of the edge point of the at least one peak figure, a time length of the second pulse width to thereby calculate a target time. The distance calculator calculates a distance to the target object as a function of the calculated target time.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Japanese Patent Application Publication No. 2016-176750 discloses an optical distance measuring apparatus. The disclosed optical distance measuring apparatus, which includes the array of single photon avalanche diodes (SPADs) and an adder, calculates, using the adder, the sum of pulse signals respectively outputted from some diodes included in the array of the SPADs; each of the diodes outputs the corresponding pulse signal that depends on corresponding incident light that is reflected light from a target object.

Then, the disclosed optical distance measuring apparatus records, as a frequency, the calculated sum of the pulse signals every predetermined period to thereby generate a histogram. The disclosed optical distance measuring apparatus thereafter detects, in the histogram, a peak representing the maximum value selected in the frequencies, and calculates the distance of the target object relative to the apparatus in accordance with the time of occurrence of the peak.

Japanese Patent Publication No. 5644294 is also cited as a reference document to this application.

The inventors of the present disclosure have considered how to improve the measurement accuracy of such an optical distance measuring apparatus to thereby gain a new insight that the time of occurrence of the peak in the histogram varies depending on the intensity of incident light. The inventors of the present disclosure have found, based on their insight, that calculation of the distance of a target object relative to the optical distance measuring apparatus using the time of occurrence of the peak may cause the calculation result to vary depending on change of the intensity of incident light, resulting in the measurement accuracy of the optical distance measuring apparatus deteriorating.

The present disclosure can be implemented as an exemplary aspect described hereinafter.

Specifically, the exemplary aspect of the present disclosure provides an optical distance measuring apparatus. The optical distance measuring apparatus includes a light source configured to irradiate a target object with at least one light pulse having a first pulse width, and at least one light receiver configured to output a pulse signal. The output signal represents reflection light from the target object being incident on the at least one light receiver, and has a second pulse width that is larger than or equal to the first pulse width. The optical distance measuring apparatus includes a histogram generator configured to record, every predetermined period, a frequency representing the number of pulse signals outputted from the at least one light receiver to thereby generate a histogram. The optical distance measuring apparatus includes a peak detector configured to detect, from the histogram, an edge point of at least one peak figure included in the histogram. The optical distance measuring apparatus includes a distance calculator configured to subtract, from a time indicative of the edge point of the at least one peak figure, a time length of the second pulse width to thereby calculate a target time, and calculate a distance to the target object as a function of the calculated target time.

The apparatus according to the exemplary aspect is configured such that the second pulse width of the pulse signal outputted from the at least one light receiver is larger than or equal to the first pulse width of the at least one light pulse transmitted from the light source. This configuration enables subtraction of the time length of the second pulse width from the edge point of the at least one peak figure included in the histogram to accurately calculate, as the target time, an incident time of the reflection light on the at least one light receiver. Calculating the distance to the target object based on the calculated incident time therefore enables the distance to the target object to be accurately obtained independently of the intensity of the reflection light incident on the at least one light receiver.

The following describes exemplary embodiments of the present disclosure with reference to the accompanying drawings. In the exemplary embodiments and their modifications, like reference characters are assigned to like or identical parts between the exemplary embodiments and their modifications, so that the descriptions for one of the like or identical parts are applied to another of the like or identical parts.

First Embodiment

The following describes an example of the configuration of an optical distance measuring apparatus 10 according to the first embodiment with reference to FIGS. 1 to 4.

Figure 1:
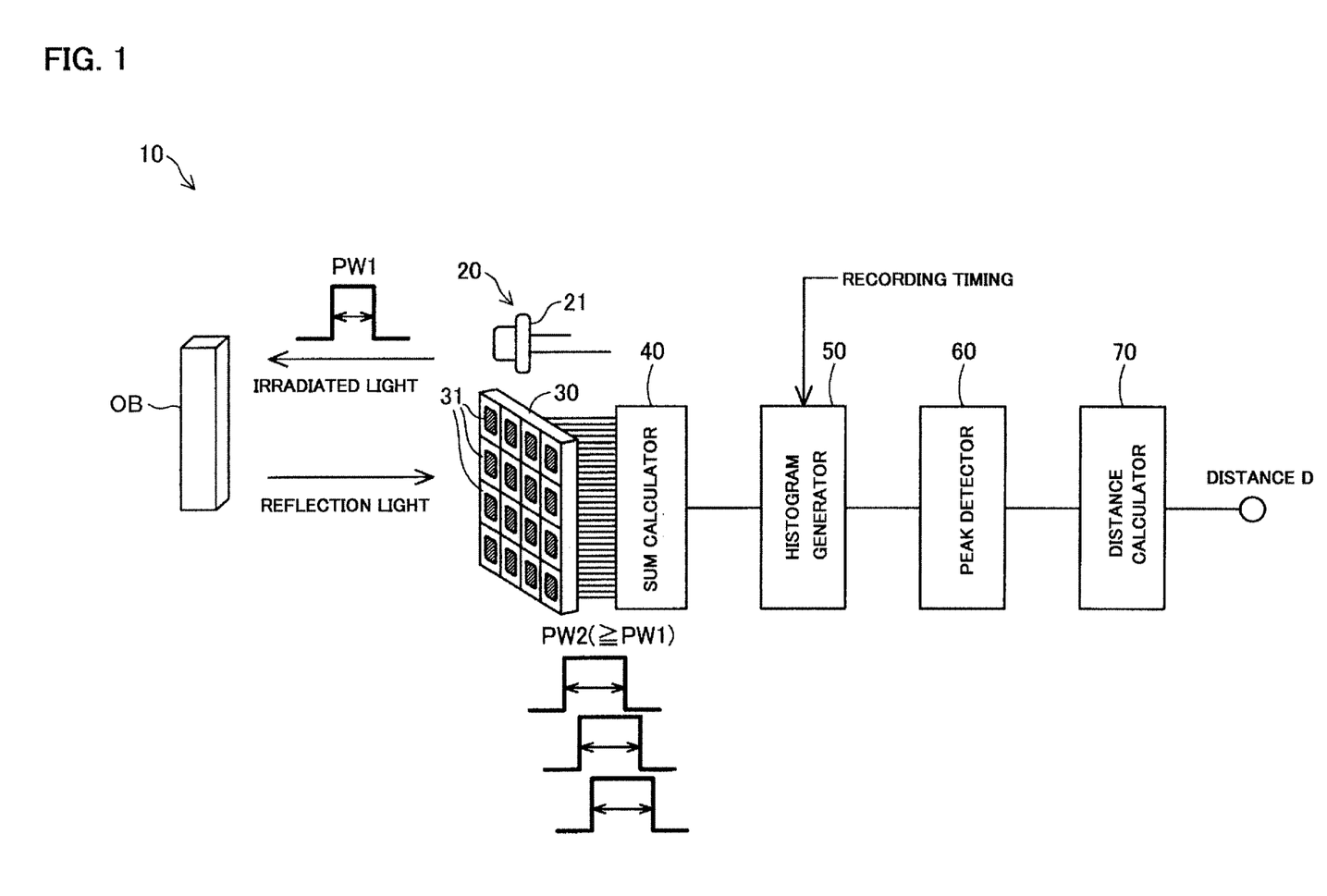
FIG. 1 is a diagram illustrating a schematic configuration of an optical distance measuring apparatus.

Referring to FIG. 1, the optical distance measuring apparatus 1 includes a light source 20, a light-receiver array 30, a sum calculator 40, a histogram generator 50, a peak detector 60, and a distance calculator 70. Each of the sum calculator 40, histogram generator 50, peak detector 60, and distance calculator 70 can be designed as an electronic circuit. One or more unillustrated central processing units (CPUs) can carry out one or more programs to thereby implement these components 40, 50, 60, and 70 as software-based components. The optical distance measuring apparatus 10 is for example installed in a vehicle and used for detection of obstacles and for cruise assistance of the vehicle.

The light source 20 serves as an apparatus that irradiates a target object OB with light for measurement of the distance to the target object OB relative to the apparatus 10. The light source 20 of the first embodiment for example includes a laser diode device 21. The laser diode device 21 is driven to transmit pulsed laser light, i.e. laser light pulses, each of which has a first pulse width PW1. That is, the laser diode device 21 is configured to transmit a laser light pulse every predetermined period. The light source 20 of the first embodiment, which is comprised of the laser diode device 21, can be comprised of another light emitting device, such as a solid-state laser device.

The light receiver array 30 includes light receivers 31; each of the light receivers 31 is capable of outputting a pulse signal in response to receiving reflected light from the target object OB.

Figure 2:
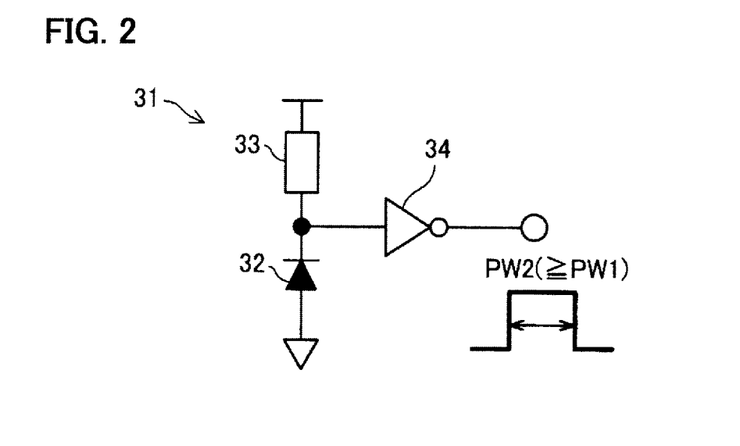
FIG. 2 is a diagram illustrating a schematic configuration of a light receiver.

Each of the light receivers 31, as illustrated in FIG. 2, is configured as a known circuit comprised of, for example, an avalanche photodiode 32 serving as a light receiving device, a quench resistor device 33, and an inverter, i.e. a NOT gate, 34. Specifically, each light receiver 31 is configured such that the avalanche photodiode 32 and quench resistor device 33 are connected in series between a power source and a grounded line, and a connection point between the avalanche photodiode 32 and quench resistor device 33 is connected to an input terminal of the inverter 34.

The quench resistor device 33 is disposed to be closer to the power source than the avalanche photodiode 32 is, and is connected to the power source. The avalanche photodiode 32, which is disposed to be closer to the ground line than the quench resistor device 33 is, is connected to be reverse-biased between the power source and the ground line. Each light receiver 31 configured above is also called a single photon avalanche photodiode (SPAD).

That is, the light receiver array 30 is designed as a silicon photo multiplier (SiPM) that is comprised of the light receivers 31 arranged in an array.

Each light receiver 31 is configured to operate in a Geiger mode to output a pulse signal to the sum calculator 40 with a constant probability in response to receiving a photon of reflected light from the target object OB. That is, a pulse signal outputted from any light receiver 31 represents that reflected light from the target object OB is incident on the corresponding light receiver 31.

A pulse signal outputted from each light receiver 31 has a second pulse width PW2 that is previously determined to be more than or equal to the first pulse width PW1.

The sum calculator 40 is configured to receive the pulse signals outputted substantially simultaneously from at least some of the light receivers 31 and calculates, as a pulse-number sum, the number of the received pulse signals. Then, the sum calculator 40 is configured to output the calculated pulse-number sum to the histogram generator 50.

The histogram generator 50 is configured to generate a histogram based on the pulse-number sum outputted from the sum calculator 40.

Figure 3:
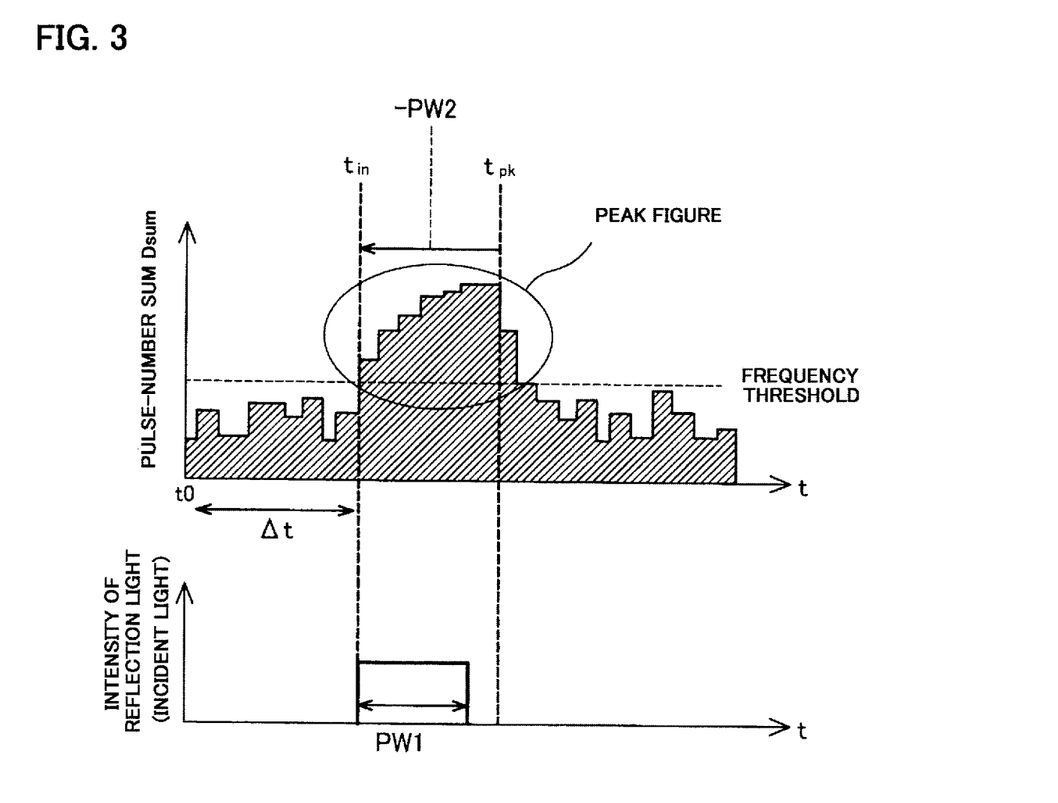
FIG. 3 is a graph illustrating an example of a histogram.

FIG. 3 illustrates an example of the histogram generated by the histogram generator 50. The histogram has a horizontal axis representing class intervals; each of the class intervals shows a corresponding value of time of flight (TOF) that is defined as time between the emitting of a corresponding laser light pulse and the receiving of reflected light based on the emitted laser light pulse.

The histogram also has a vertical axis representing, as a frequency, a value of the pulse-number sum calculated by the sum calculator 40; the value of the pulse-number sum represents an intensity of the reflected light from the target object OB.

The histogram generator 50 records the value of the pulse-number sum outputted from the sum calculator 40 every recording period that is synchronized with the period at which the laser light pulse is emitted from the light source 20, thus generating the histogram.

If the target object OB is located within a range where the laser light pulse is irradiated from the light source 20, a selected frequency in the frequencies of the histogram, which corresponds to a selected class interval in the class intervals of the histogram, will become larger; the selected class interval corresponds to a time of reflected light from the target object OB being incident on the light receiver array 30. That is, if there is a larger class interval in the class intervals of the histogram, it will be possible to calculate the distance to the target object OB in accordance with the time corresponding to the larger class interval.

The histogram generator 50 can be configured to transmit the laser light pulse several times for generation of one histogram, and integrate the pulse-number sums, i.e. frequencies, obtained based on the transmitted laser light pulses to thereby generate one histogram. This configuration enables a signal-to-noise ratio (S/N ratio) of the generated histogram to be improved.

The peak detector 60, which is illustrated in FIG. 1, is configured to detect, in the histogram generated by the histogram generator 50, a peak edge point tpk that represents an end point, i.e. a falling-edge point, of a peak figure (see FIG. 3). Peaks in the histogram according to the first embodiment each represent a frequency at a corresponding class interval, which is higher than a predetermined frequency threshold. The peak figure represents the assembly of adjacently successive peaks in the histogram, which has a substantially crest configuration.

The peak figure is comprised of frequencies that sequentially increase over time, so that a selected class interval corresponding to the last frequency of the peak figure immediately before a next decreased frequency in the histogram is defined as the peak edge point tpk illustrated in FIG. 3.

The distance calculator 70 is configured to subtract, from the time, i.e. the value of the TOF, of the peak edge point tpk, a time length of the second pulse width PW2 to thereby calculate a light incident time tin. The distance calculator 70 is additionally configured to calculate a distance D to the target object OB relative to the apparatus 10 based on the calculated light incident time tin.

Specifically, the distance calculator 70 is configured to subtract, from the light incident time tin, a time point tO representing the time of transmitting the corresponding laser light pulse from the light source 20 to thereby calculate a time length Δt, and calculate the distance D to the target object OB in accordance with the following equation (1):

$$D=(\Delta t \times c)/2 \qquad (1)$$

where Δt represents the calculated time length, and c represents the speed of light.

The distance calculator 70 is configured to output the calculated distance D to, for example, an unillustrated ECU installed in the vehicle. The ECU installed in the vehicle is configured to detect obstacles and/or perform cruise assistance of the vehicle in accordance with the distance D.

Figure 4:
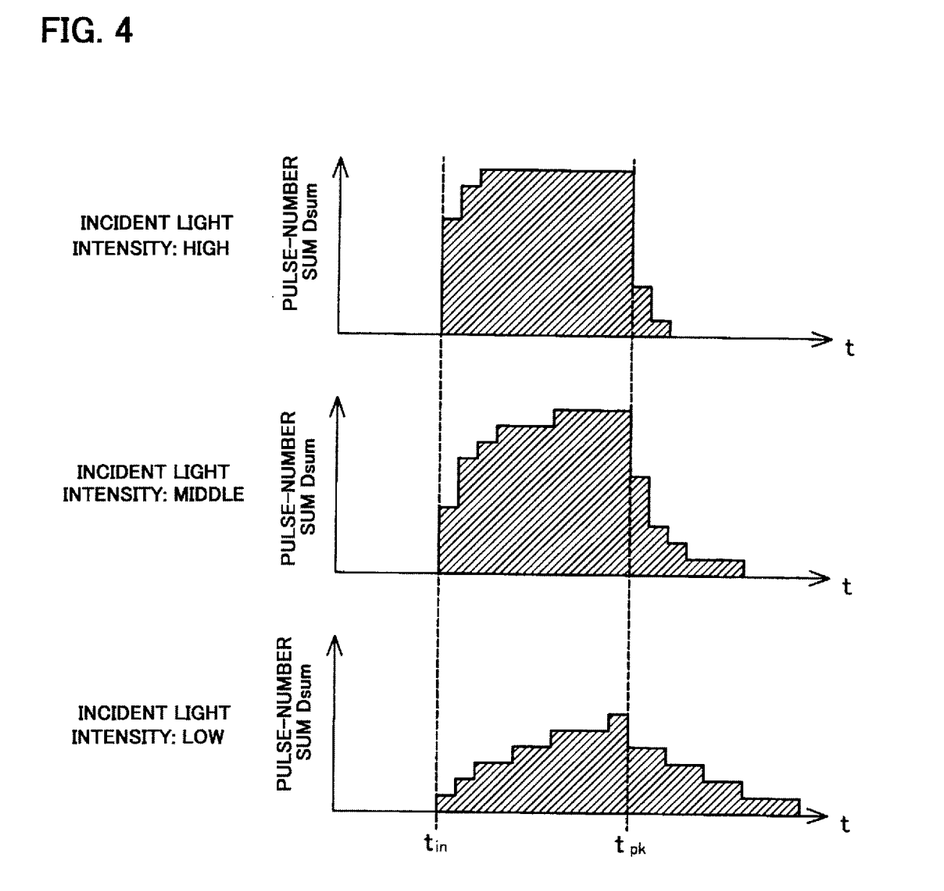
FIG. 4 is graph illustrating histograms respectively generated based on different intensity levels of incident light.

FIG. 4 illustrates three histograms respectively generated based on three different intensity levels of reflected light that is incident on the light receiver array 30. The histogram based on the highest intensity level of reflected light incident on the light receiver array 30 will be referred to as a highest-intensity histogram, the histogram based on the medium intensity level of reflected light incident on the light receiver array 30 will be referred to as a middle-intensity histogram, and the histogram based on the lowest intensity level of reflected light incident on the light receiver array 30 will be referred to as a lowest-intensity histogram.

As illustrated in FIG. 4, the frequency of a histogram generated by the histogram generator 50 immediately after the light incident time tin that represents reflected light incident timing on the light receiver array 30 becomes higher as the intensity level of the reflected light incident on the light receiver array 30 becomes higher. This is because, the higher the intensity level of reflected light incident on the light receiver array 30, the larger the number of light receivers 31 in the light receiver array 30, which substantially simultaneously output pulse signals, resulting in the pulse-number sum being larger.

In contrast, the lower the intensity level of reflected light incident on the light receiver array 30, the smaller the number of light receivers 31 in the light receiver array 30, which substantially simultaneously output pulse signals, resulting in the frequencies of the histogram being smaller.

When the incident timing tin of each of the light receivers 31 at which reflected light is incident on the corresponding one of the light receivers 31 is the same, the falling timing of a pulse signal outputted firstly from each of light receivers 31 is the same, resulting in the position of the peak edge point tpk being constant independently of the intensity level of reflected light incident on the light receiver array 30.

As described above, the optical distance measuring apparatus 1 according to the first embodiment is configured to subtract, from the time of the peak edge point tpk, the time length of the second pulse width PW2 to thereby calculate the light incident time tin, and calculate the distance D to the target object OB as a function of the light incident time tin. The second pulse width PW2 to be outputted from each light receiver, i.e. each light receiving element, 31 is set to be longer or equal to the first pulse width PW1 of a laser light pulse to be emitted from the light source 20, which can be expressed by the following equation PW2 PW1.

This configuration of the apparatus 1 enables the duration of light, i.e. the width of pulsed light, reflected from the target object OB and incident on at least one light receiver 31, which substantially corresponds to the first pulse width PW1, to be constantly shorter or equal to the second pulse width PW2 of a pulse signal outputted from the at least one light receiver 31 in response to the incident of the reflected light on the at least one light receiver 31.

Subtracting, from the time of the peak edge point tpk representing the end point of the peak figure, the time length of the second pulse width PW2 therefore enables the light incident time tin that represents reflected light incident timing on the light receiver array 30 to be constantly calculated.

FIG. 4 shows that, like the peak edge point tpk, the reflected light incident timing tin is kept unchanged independently of the intensity level of the reflected light incident on the light receiver array 30.

Accordingly, the optical distance measuring apparatus 1 according to the first embodiment calculates the incident timing tin of reflected light incident on the light receiver array 30 with higher accuracy, making it possible to measure, based on the incident timing tin, the distance D to the target object OB with higher accuracy even if a reflection rate of the target object OB and/or ambient light have an impact on the intensity level of reflected light incident on the light receiver array 30 of the apparatus 1.

Second Embodiment

The following describes the second embodiment of the present disclosure.

As illustrated in FIGS. 3 and 4, the first embodiment describes an example that a histogram generated by the histogram generator 50 has a single peak figure, i.e. a single peak shape. Note that, as illustrated in FIG. 5, a histogram generated by the histogram generator 50 has plural peak figures due to, for example, ambient light.

Figure 5:
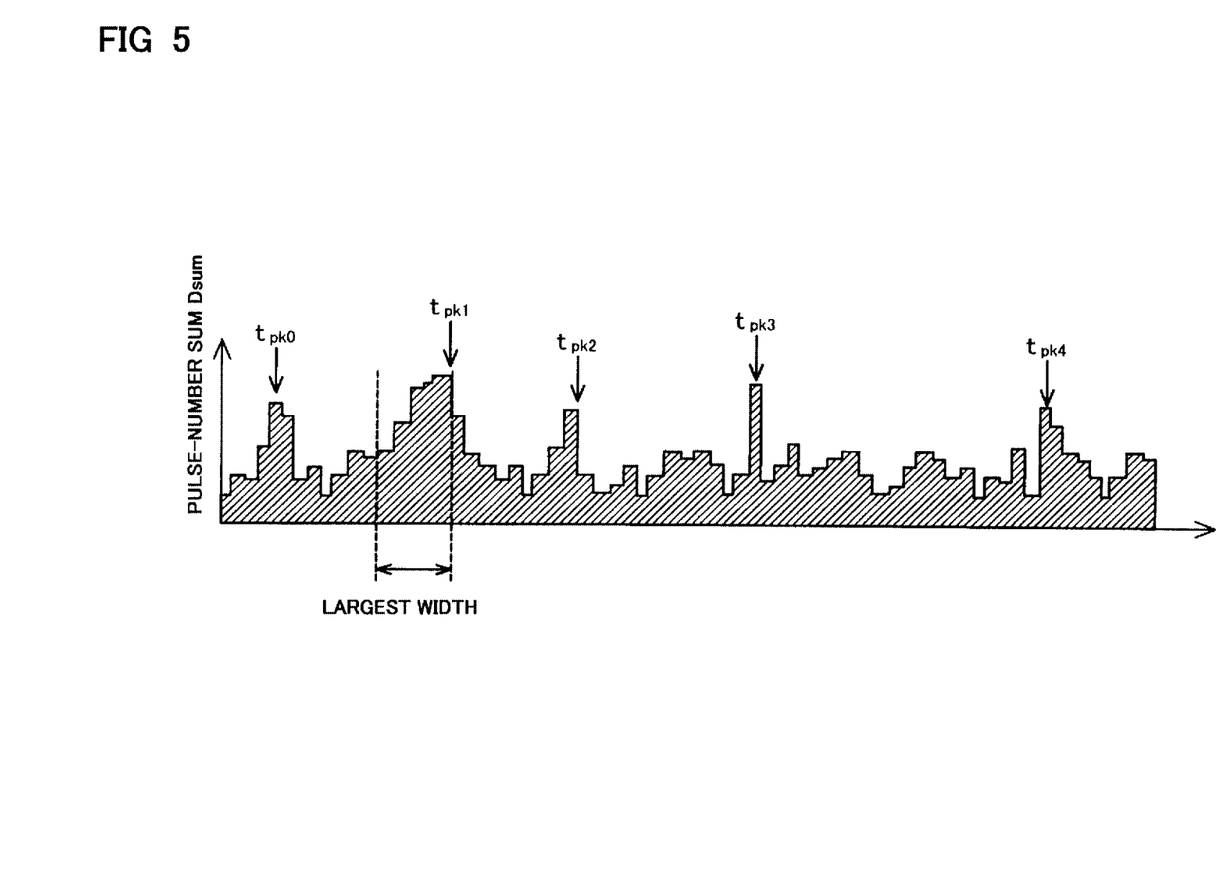
FIG. 5 is a graph illustrating a histogram according to the second embodiment.
Figure 6:
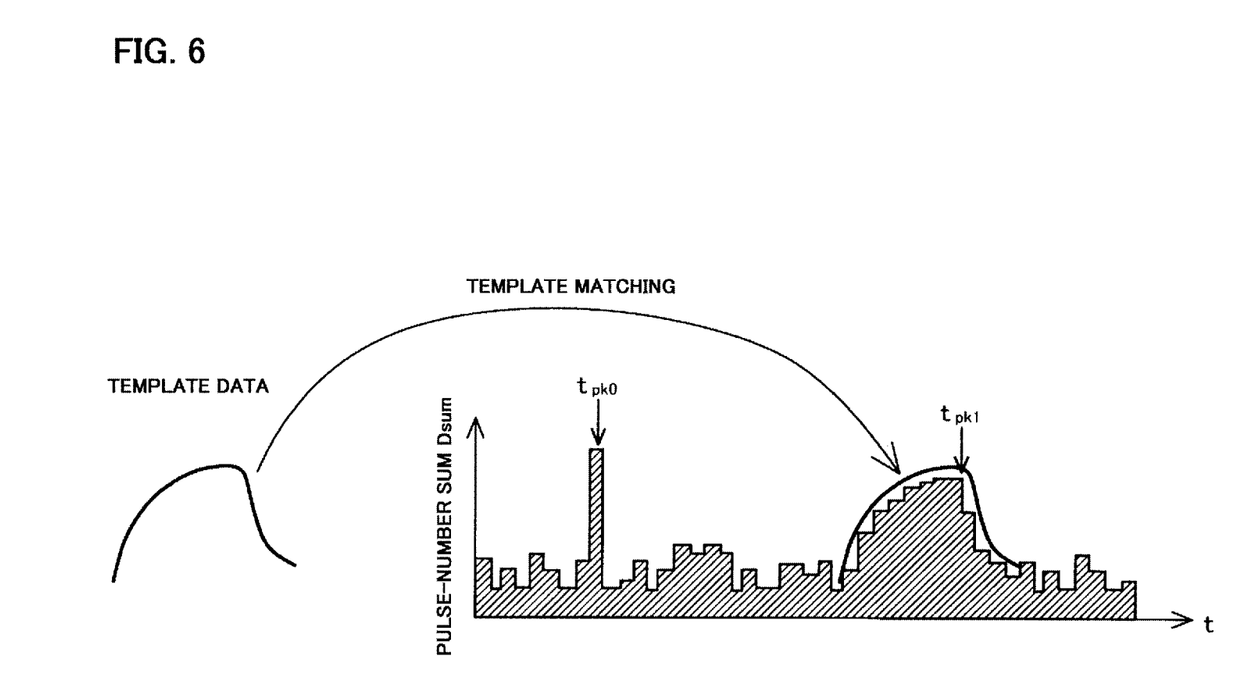
FIG. 6 is a graph illustrating a peak detection method according to the third embodiment.

From this viewpoint, the peak detector 60 according to the second embodiment is configured to detect, in the histogram generated by the histogram generator 50, plural peak figures, and detect, from each peak figure, a peak edge point tpk that represents an end point of the corresponding peak figure (see FIG. 5).

The distance calculator 70 according to the second embodiment is configured to select one of the peak figures; the selected one of the peak figures has a larger width than widths of any other peak figures. The distance calculator 70 of the second embodiment is additionally configured to calculate the distance to the target object OB as a function of the peak edge point tpk of the selected one of the peak figures.

For example, the distance calculator 70 can be configured to

1. Select one of the peak figures, which has a largest width in all the peak figures, i.e. has a largest number of class intervals included therein in all the peak FIGS.
2. Calculate the distance to the target object OB as a function of the peak edge point tpk of the selected one of the peak figures The apparatus 1 configured to calculate the distance to the target object OB based on the peak edge point tpk of the selected one of the peak figures, which has a larger width than a width of another of the peak figures, thus inhibiting calculation of the distance to the target object OB using a false peak figure generated due to, for example, ambient light.

The distance calculator 70 can be configured to calculate distance candidates to the target object based on the respective peak figures, and output the calculated distance candidates to the ECU installed in the vehicle. The ECU can be configured to determine which of the distance candidates is an actual distance to the target object OB in accordance with predetermined reference information. For example, the ECU can be configured to determine one of the distance candidates as the actual distance to the target object OB; the determined one of the distance candidates is the closest to a previously determined actual distance to the target object OB.

Third Embodiment

The following describes the third embodiment of the present disclosure.

The peak detector 60 of each of the first and second embodiments is configured to compare the frequencies of the histogram generated by the histogram generator 50 with the predetermined frequency threshold to thereby detect at least one peak figure in the histogram.

In contrast, the peak detector 60 of the third embodiment is configured to compare the shape of the histogram generated by the histogram generator 50 with previously prepared tentative peak figure templates to thereby detect at least one peak figure in the histogram.

Specifically, the peak detector 60 of the third embodiment is configured to store template data including the previously prepared tentative peak figure templates in a memory of the apparatus 10. The peak detector 60 is additionally configured to perform a known template-matching approach for the histogram and the template data to thereby extract at least one portion that substantially matches at least one of the tentative peak figure templates, thus determining the extracted at least one portion in the histogram as at least one peak figure.

This configuration inhibits calculation of the distance to the target object OB using a false peak figure generated due to, for example, ambient light.

Fourth Embodiment

The following describes the fourth embodiment of the present disclosure.

The optical distance measuring apparatus 10 of the fourth embodiment is further comprised of an adjuster 80 (see FIGS. 7, 9, and 10) for maintaining that the first pulse width PW1 and the second pulse width PW2 constantly have the following relationship:

PW2≥PW1

Specifically, the adjuster 80 is configured to measure the second pulse width PW2 of the pulse signal outputted from each of at least some of the light receivers 31, and change at least one of the first pulse width PW1 and the second pulse width PW2 to thereby adjust the second pulse width PW2 to be longer or equal to the first pulse width PW1. The adjuster 80 can be designed as an electronic circuit or a programmable software module.

Figure 7:
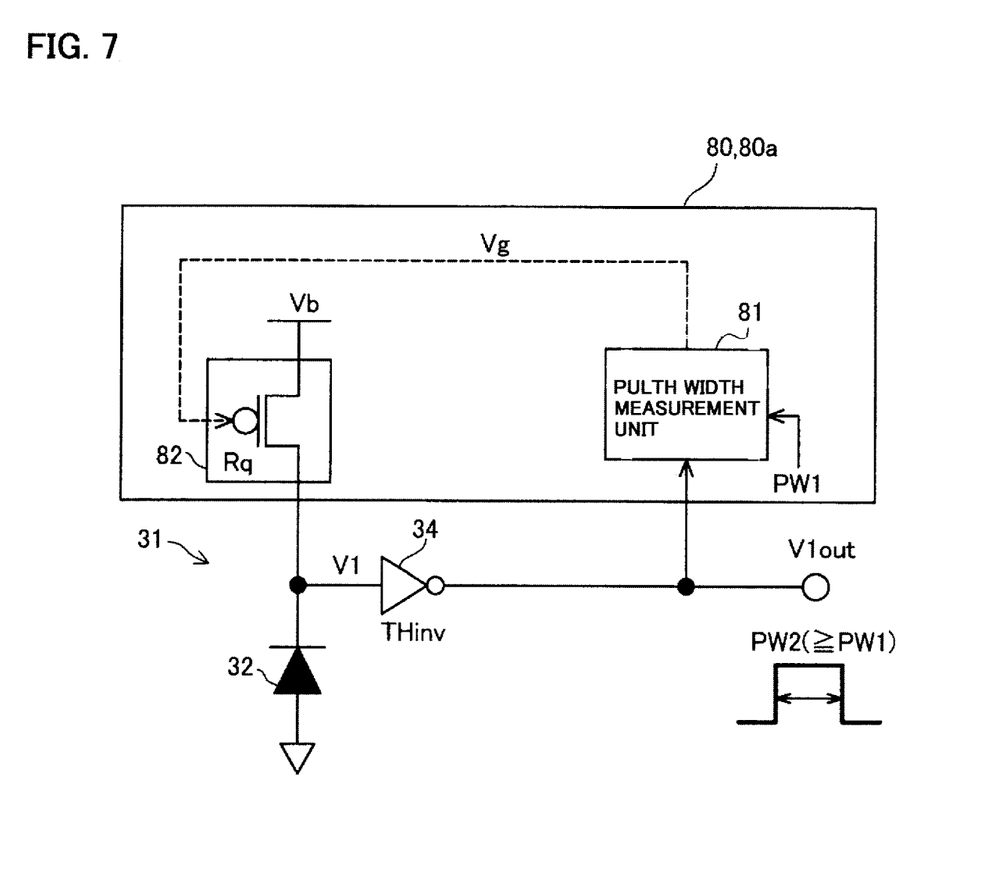
FIG. 7 is a diagram illustrating a first example of an adjuster according to the fourth embodiment.

FIG. 7 schematically illustrates a first example of the adjuster 80.

A first adjuster 80a as the first example of the adjuster 80 is configured to change a resistance value Rq of a quenching resistor connected to the avalanche photodiode 32 included in each light receiver 31 to thereby adjust the second pulse width PW2 of a pulse signal outputted from the corresponding light receiver 31.

Specifically, the first adjuster 80a includes a pulse width measurement unit 81, and a quenching resistor circuit 82 in place of the quenching resistor device 33; the quenching resistor circuit 82 can be comprised of, for example, a transistor, such as an FET.

As known by skilled persons in the art, FETs each have linear characteristics in which a drain current varies in proportion to a gate voltage Vg applied to the gate of the corresponding transistor. This enables adjustment of the gate voltage Vg applied to the gate of a transistor to serve the quenching resistor circuit 82 as a voltage-controlled variable resistor.

The pulse width measurement unit 81 is configured to measure the riding timing and falling timing of each of the pulse signals outputted from the light receiver 31 every predetermined sampling period, and calculate an elapsed time from the rising timing to the falling timing of each of the pulse signals as the second pulse width PW2 for the corresponding one of the pulse signals.

The pulse width measurement unit 81 is additionally configured to change the gate voltage Vg to be applied to the quenching resistor circuit 82 to thereby change the resistance value Rq of the quenching resistor circuit 82, thus adjusting that the calculated second pulse width PW2 is longer or equal to the first pulse width PW1 of a laser light pulse that will be emitted from the light source 20.

Figure 8:
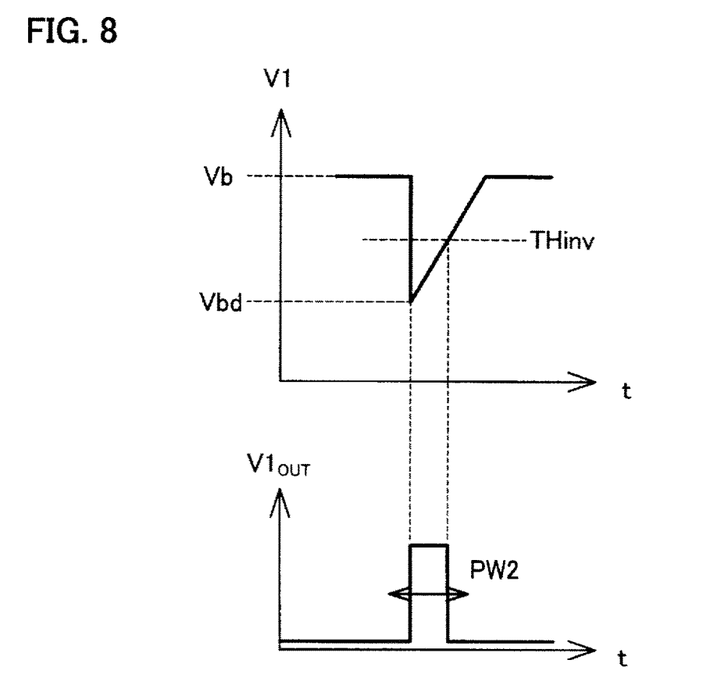
FIG. 8 is a graph illustrating a method of adjusting a second pulse width according to the fourth embodiment.

FIG. 8 schematically shows an example of the relationship between an input voltage to the inverter 34 of the light receiver 31 and an output voltage from the inverter 34 thereof. Specifically, the top part of FIG. 8 illustrates how the input voltage to the inverter 34, which will be referred to as V1, is changed over time, and the bottom part of FIG. 8 illustrates how the output voltage from the inverter 34, which will be referred to as V1out, is changed over time.

When light is incident on the avalanche photodiode 32 operating in the Geiger mode, the input voltage V1 to the inverter 34 decreases abruptly from a bias voltage level Vb applied to the light receiver 31 down to a breakdown voltage Vbd. This causes the output voltage V1out from the inverter 34 to rise from a low level to a high level. Thereafter, the input voltage V1 to the inverter 34 has been recovered up to the bias voltage Vb. When the input voltage V1 to the inverter 34 exceeds a threshold voltage level THinv of the inverter 34 during the recovery period of the input voltage V1, the output voltage Vout1 from the inverter 34 falls down from the high level to the low level.

Changing, by the adjuster 80a illustrated in FIG. 7, the value Rq of the quenching resistor of the light receiver 31, which is configured to operate set forth above, enables the recovery speed of the input voltage V1 to the inverter 34 from the breakdown voltage Vbd to be changed, making it possible to change the pulse width of the output voltage V1out from the inverter 34, which serves as the second pulse width PW2.

That is, the first adjuster 80a is configured to adjust the second pulse width of a pulse signal outputted form each light receiver 31 to automatically maintain the following relationship between the first pulse width PW1 and the second pulse width PW2 even if the first pulse width PW1 and/or the second pulse width PW2 are changed depending on the temperature dependency characteristics of the laser diode device 21 and/or light receiver 31:

PW2≥PW1

Figure 9:
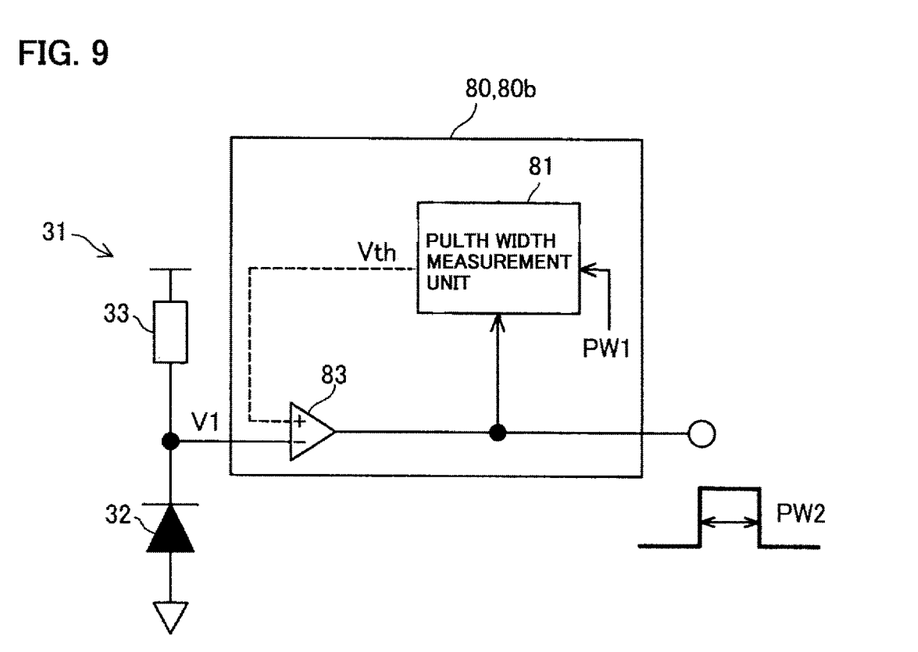
FIG. 9 is a diagram illustrating a second example of the adjuster according to the fourth embodiment.

FIG. 9 schematically illustrates a second example of the adjuster 80.

A second adjuster 80b as the second example of the adjuster 80 is configured to
(1) Change a reference threshold voltage Vth that is used to be compared with a signal outputted from the avalanche photodiode 32 included in the light receiver 31; this comparison enables the light receiver 31 to output a pulse signal
(2) Adjust the second pulse width PW2 of the pulse signal based on the changing of the reference threshold voltage Vth Specifically, the second adjuster 80b includes a pulse width measurement unit 81, and a comparator 83 in place of the inverter 34.

To the comparator 83, a voltage V1 outputted from the avalanche photodiode 32 is inputted. More specifically, to the comparator 83, a voltage V1 at the connection point between the quenching resistor device 33 and the avalanche photodiode 32 is inputted.

The comparator 83 is configured to compare the voltage V1 with the reference threshold voltage Vth outputted from the pulse width measurement unit 81.

The comparator 83 is additionally configured to
1. Set the level of an output voltage Vout from the comparator 83 to the high level upon the comparison result representing that the voltage V1 is lower than the reference threshold voltage Vth
2. Set the level of the output voltage Vout from the comparator 83 to the low level upon the comparison result representing that the voltage V1 is higher than the reference threshold voltage Vth That is, the pulse width measurement unit 81 of the second adjuster 80b is configured to vary the reference threshold voltage Vth inputted to the comparator 83 to thereby automatically maintain that the first pulse width PW1 and the second pulse width PW2 constantly have the following relationship even if the first pulse width PW1 and/or the second pulse width PW2 are changed depending on the temperature dependency characteristics of the laser diode device 21 and/or light receiver 31:

PW2≥PW1

Figure 10:
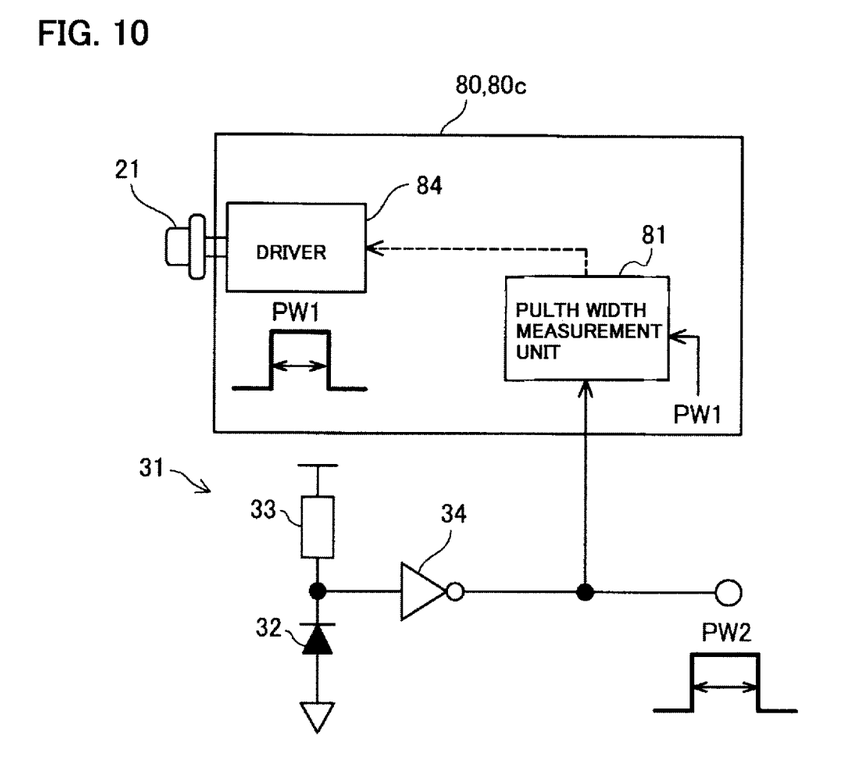
FIG. 10 is a diagram illustrating a third example of the adjuster according to the fourth embodiment.

FIG. 10 schematically illustrates a third example of the adjuster 80.

A third adjuster 80c as the third example of the adjuster 80 includes a pulse width measurement unit 81. The light source 20 includes a driver 84 for driving the laser diode device 21, and the pulse width measurement unit 81 is connected to the driver 84. That is, the driver 84 is configured to drive the laser diode device 21 to cause the laser diode device 21 to transmit laser light pulses each having the first pulse width PW1.

The pulse width measurement unit 81 is configured to measure the second pulse width PW2 of each of the pulse signals outputted from the light receiver 31 as set forth above. The pulse width measurement unit 81 is additionally configured to control the driver 84 to thereby adjust the first pulse width PW1 of a laser light pulse that will be emitted from the laser light device 21, thus maintaining the measured second pulse width PW2 to be longer or equal to the first pulse width PW1. More specifically, the pulse width measurement unit 81 is additionally configured to control the driver 84 to thereby adjust the falling timing of a first pulse signal for a laser light pulse that will be emitted from the laser light device 21, thus maintaining the measured second pulse width PW2 to be longer or equal to the first pulse width PW1.

That is, the third adjuster 80c is configured to automatically maintain the following relationship between the first pulse width PW1 and the second pulse width PW2 even if the first pulse width PW1 and/or the second pulse width PW2 are changed depending on the temperature dependency characteristics of the laser diode device 21 and/or light receiver 31:

PW2≥PW1

The adjuster 80 according to the fourth embodiment can be configured as the combination of at least two of the first to third adjusters 80a to 80c. That is, the adjuster 80 according to the fourth embodiment can be configured to adjust at least two of (i) the resistor of the quenching resistor circuit 82, (ii) the reference threshold voltage Vth inputted to the comparator 83, and (iii) the falling timing of the first pulse signal, thus maintaining that the first pulse width PW1 and the second pulse width PW2 constantly have the following relationship:

PW2≥PW1

Figure 11:
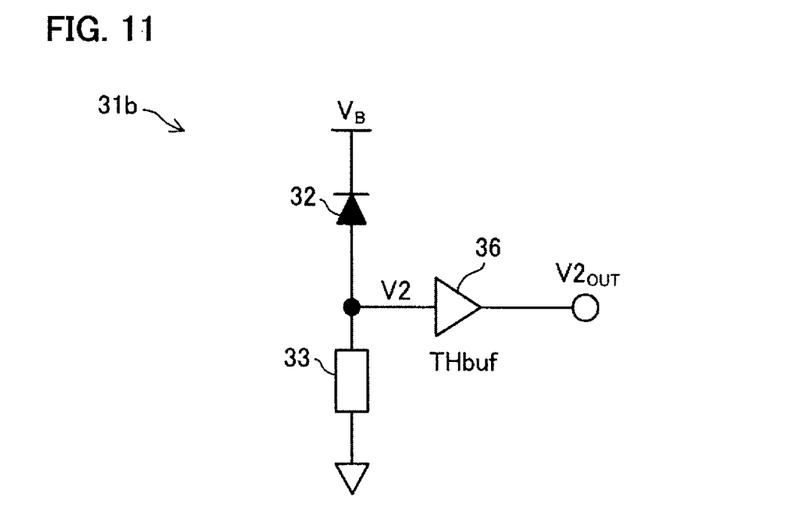
FIG. 11 is a diagram illustrating a modified configuration of the light receiver.

FIG. 11 illustrates a modified configuration of the light receiver 11. As illustrated in FIG. 2, the light receiver 31 according to the first embodiment is configured such that the avalanche photodiode 32, which is disposed to be closer to the ground line than the quenching resistor device 33 is, is connected to the ground line, and the quenching circuit is connected to the power source.

In contrast, a light receiver 31b according to the modified configuration is configured such that the avalanche photodiode 32, which is disposed to be closer to the power source than the quench resistor device 33 is, is connected to be reverse-biased between the power source and the ground line. The light receiver 31b is additionally configured such that the quenching resistor device 33 is connected to the ground line. To the connection point between the avalanche photodiode 32 and quenching circuit 33, a buffer circuit 36 is connected.

Figure 12:
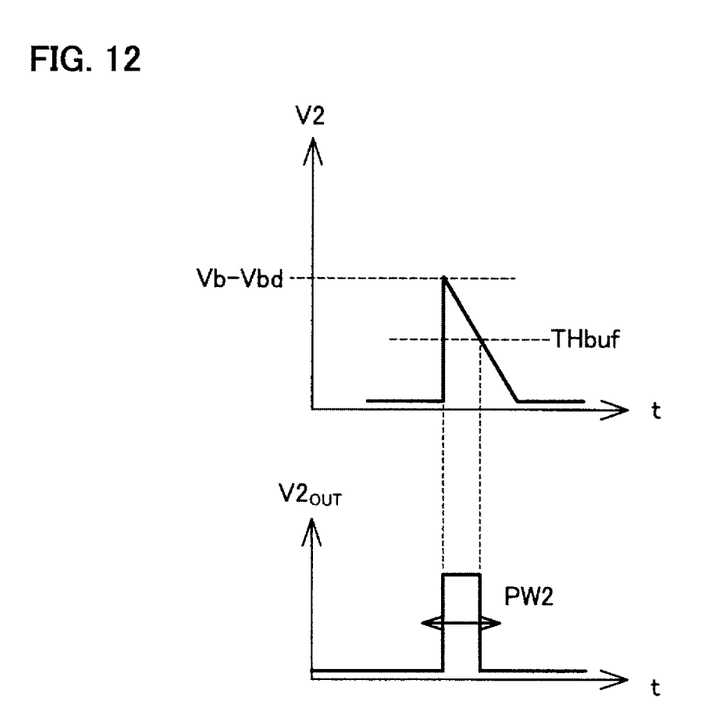
FIG. 12 is a graph illustrating a pulse signal outputted from the light receiver illustrated in FIG. 11.

FIG. 12 schematically shows an example of the relationship between an input voltage V2 to the buffer circuit 36 of the light receiver 31b and an output voltage V2out from the buffer circuit 36 thereof. Specifically, like the light receiver 31 illustrated in FIG. 2, FIG. 12 shows that the above configuration of the light receiver 31b illustrated in FIG. 11 enables the light receiver 11 to generate a pulse signal.

The quenching resistor device 33 is comprised of a variable resistor, such as a transistor. This configuration of the quenching resistor device 33 enables the second pulse width PW2 to be adjusted in the same approach as that described in the fourth embodiment based on FIGS. 7 and 8.

The optical distance measuring apparatus 10 according to each of the above embodiments is comprised of the plurality of light receivers 31 but can be comprised of a single light receiver 31. The optical distance measuring apparatus 10 according to this modification is preferably configured to transmit the laser light pulse several times for generation of one histogram, and integrate the pulse-number sums, i.e. frequencies, obtained based on the transmitted laser light pulses to thereby generate one histogram.

The second pulse signals illustrated in some figures in the above embodiments are each configured as an active-high signal, in other words, a positive pulse signal, but can be each configured as an active-low signal, in other words, a negative pulse signal.

While the illustrative embodiments of the present disclosure have been described herein, the present disclosure is not limited to the embodiments described herein but can be implemented by various configurations within the scope of the present disclosure. For example, one or some technical features disclosed in the above embodiments can be replaced with other technical features or combined with each other to solve a part or all the above problem or to achieve at least one of or all of the above benefits. If at least one of the technical features disclosed in the above embodiments is not described as an essential component, the at least one of the technical features can be emitted.

What is claimed is:

1. An optical distance measuring apparatus comprising:
   a light source configured to irradiate a target object with at least one light pulse having a first pulse width;
   at least one light receiver configured to output a pulse signal that:
      represents reflection light from the target object being incident on the at least one light receiver, and
      has a second pulse width that is larger than or equal to the first pulse width;
   a histogram generator configured to record, every predetermined period, a frequency representing the number of pulse signals outputted from the at least one light receiver to thereby generate a histogram;
   a peak detector configured to detect, from the histogram, an edge point of at least one peak figure included in the histogram; and
   a distance calculator configured to:
      subtract, from a time indicative of the edge point of the at least one peak figure, a time length of the second pulse width to thereby calculate a target time; and
      calculate a distance to the target object as a function of the calculated target time.

2. The optical distance measuring apparatus according to claim 1, wherein:
   the at least one light receiver comprises a plurality of light receivers,
   the optical distance measuring apparatus further comprising:
      a sum calculator configured to calculate the number of pulse signals that are substantially simultaneously outputted from the plurality of light receivers as a pulse-number sum,
      the histogram generator being configured to record the pulse-number sum as the frequency.

3. The optical distance measuring apparatus according to claim 1, wherein:
   the at least one peak figure comprises a plurality of peak figures included in the histogram;
   the peak detector is adapted to detect, from the histogram, the plurality of peak figures; and
   the distance calculator is configured to select, from the plurality of peak figures, one of the peak figures, and calculate the distance to the target object based on the edge point of the selected one of the peak figures, the selected one of the peak figures having a largest width in all the peak figures.

4. The optical distance measuring apparatus according to claim 1, further comprising:
   an adjuster configured to:
      measure the second pulse width of the pulse signal outputted from the at least one light receiver; and
      adjust, based on the measured second pulse width, at least one of the first pulse width and the measured second pulse width to thereby maintain the measured second pulse width to be longer than or equal to the first pulse width.

5. The optical distance measuring apparatus according to claim 4, wherein:
   the at least one light receiver comprises a light receiving device connected to a quenching resistor circuit that has a resistance value; and
   the adjuster is configured to adjust the resistance value of the quenching resistor circuit to thereby maintain that the measured second pulse width is longer than or equal to the first pulse width.

6. The optical distance measuring apparatus according to claim 4, wherein:
   the at least one light receiver comprises a light receiving device, and is configured to compare a voltage outputted from the light receiving device with a threshold voltage to thereby output the pulse signal; and
   the adjuster is configured to adjust the threshold voltage to thereby maintain that the measured second pulse width is longer than or equal to the first pulse width.

7. The optical distance measuring apparatus according to claim 4, wherein:
   the light source comprises a driver configured to drive a light emitting device to cause the light emitting device to irradiate the target object with the at least one light pulse; and
   the adjuster is configured to control the driver to thereby maintain that the measured second pulse width is longer than or equal to the first pulse width.

8. The optical distance measuring apparatus according to claim 1, wherein:
   the peak detector is configured to compare a shape of the histogram with a previously defined shape to thereby detect the peak figure included in the histogram.

* * * * *